United States Patent [19]

Komatsu et al.

[11] Patent Number: 5,134,536
[45] Date of Patent: Jul. 28, 1992

[54] TAPE GUIDE FOR MAGNETIC HEAD

[75] Inventors: Futaba Komatsu; Kiyoichi Fukazawa, both of Shimosuwa, Japan

[73] Assignee: Kabushiki Kaisha Sankyo Seiki Seisakusho, Japan

[21] Appl. No.: 477,869
[22] PCT Filed: Aug. 18, 1989
[86] PCT No.: PCT/JP89/00841
 § 371 Date: Apr. 5, 1990
 § 102(e) Date: Apr. 5, 1990
[87] PCT Pub. No.: WO90/02398
 PCT Pub. Date: Mar. 8, 1990

[30] Foreign Application Priority Data

Aug. 18, 1988 [JP] Japan .............. 63-107866[U]
Dec. 28, 1988 [JP] Japan .............. 63-168279[U]

[51] Int. Cl.$^5$ ............................................. G11B 15/60
[52] U.S. Cl. ............................................. 360/130.21
[58] Field of Search ............................ 360/130.21

[56] References Cited

U.S. PATENT DOCUMENTS 4,307,427 12/1981 Kawachi ............ 360/130.21 X
4,485,420 11/1984 Schoenmakers ......... 360/130.21
4,962,438 10/1990 Kunze ................ 360/130.21

FOREIGN PATENT DOCUMENTS 57-186258 11/1982 Japan .
59-63854 4/1984 Japan .
59-207050 11/1984 Japan .
60-67535 5/1985 Japan .
61-199208 9/1986 Japan .

Primary Examiner—A. J. Heinz
Attorney, Agent, or Firm—Welsh & Katz, Ltd.

[57] ABSTRACT

The present invention relates to a magnetic head having a tape guide which regulates the path of tape travel wherein a wider range of errors is allowed for the angle of attachment of the head to the recording/reproducing system to improve the reliability and slidability during use at high temperatures.

The present invention magnetic head is adopted so that a tape 9 running along a tape guide 3 is forced toward a restrictive member 5 by means of a slide contact section 4 of a sloped section 6 and a stopper 8 is provided on the side of said slide contact section 4 to prevent the tape 9 from moving toward the sloped section 6. It is further characterized in that said tape guide 3 is made of nylon resin blended with whiskers having the diameter of 0.2–0.5 µm and the length of 10–20 µm at a weight ratio of 10–40%.

5 Claims, 3 Drawing Sheets

U.S. Patent     July 28, 1992     Sheet 3 of 3     5,134,536
Fig. 13
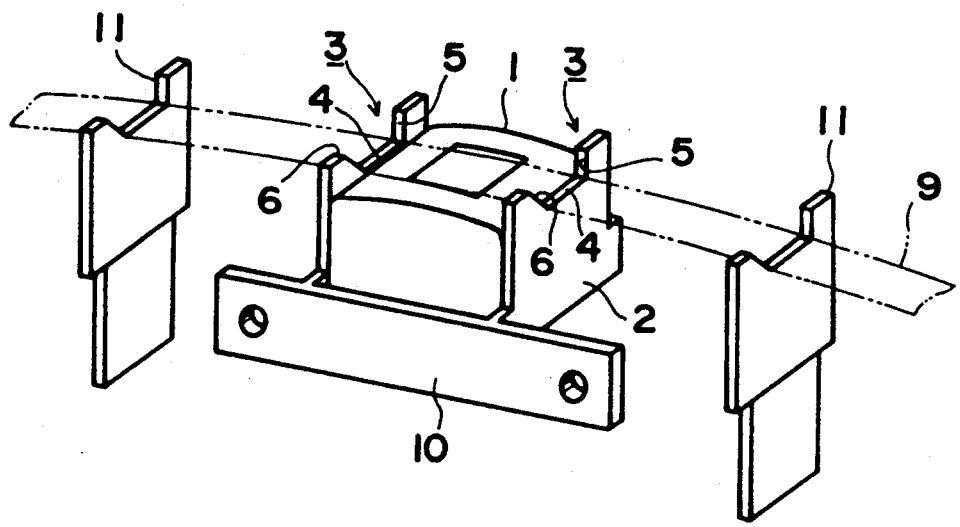
Fig. 14     Fig. 15
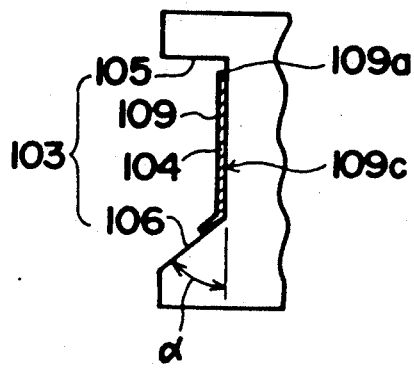 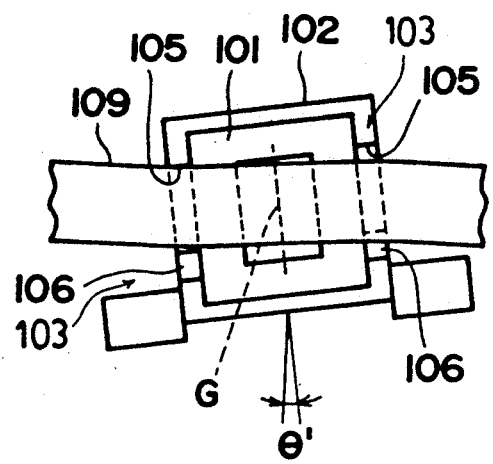
Fig. 16
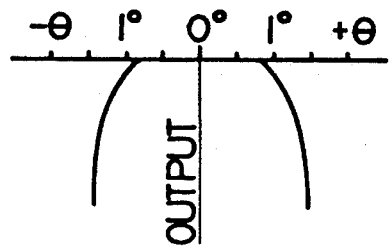

TAPE GUIDE FOR MAGNETIC HEAD

FIELD OF THE ART

The present invention relates to a magnetic head. More particularly, it relates to a magnetic head having a set of tape guides that regulate the path of a tape.

TECHNICAL TERMS

In the specification, the term "magnetic head" denotes not only a single head but also a head in which both a head for recording/reproducing and an erase head are incorporated as an integral member, or a group of plural heads forming an integral member.

BACKGROUND OF THE INVENTION

A set of tape guides are usually provided to guide a running tape so as to prevent the tape from vertically moving on the face of the head and is usually formed as integral parts of a magnetic head. A conventional magnetic head having a set of tape guides are shown in FIGS. 14 and 15, which comprises a head main body 101, a head holder 102 supporting the head body 101, and a set of tape guides 103,103 each having a slope 106 at its bottom inclined at an angle of α, whereby a running tape 109 is pressed upward against restrictive members 105,105 to restrict the vertical displacement of the tape. Such tape guides are disclosed in Japanese Utility Model Application Laid-Open No. Sho 60-67535 and Patent Application Laid-Open No. Sho 57-186258. The former has its restrictive members 105,105 formed integrally with the tape guides 103,103 of the head holder 102. Although not shown in the figure, the restrictive members 105,105 of the latter are made of a spring member and are independent of the head holder 102.

If the attachment of these heads to a magnetic recording/reproducing system is somewhat deviated from the proper attachment direction at an angle, the tape 109 may run at an right angle with respect to the head gap G when said angle is within a certain range. If the attachment is deviated by a great margin, or at an angle of θ' as shown in FIG. 15 exceeding the allowable limit, the force applied by the sloped section 106 on the tape 109 alone is not sufficient to compensate the displacement caused by inclination at θ'. As shown at the upper right in the figure, the tape will be unable to run along the predetermined position as it deviates from the restrictive member 105 of the tape guide 103. As a result, when the angle of displacement θ' is about ±50' with respect to the predetermined attachment angle (standard attachment angle), the azimuth is substantially out of registration and the output is lowered.

Conventionally, it has been proposed to increase the angle of inclination α. The angle may be increased to 40°-60° at best as in the prior art, and if the angle exceeds the limit, the tape would be more likely to curl, causing gap loss. That is, the tape would come off from the gap and the output is lowered. Particularly when the base of the tape is thin, the effect of the gap loss is so great that the tape becomes practically unusable.

Moreover, conventional tape guides 103,103 are generally made of plastic by a method such as injection molding. However, the contacting face of the restrictive member 105 against which one edge of the magnetic tape 109 slides is subject to a very high pressure in terms of a force per unit area, even if the force of the sloped section 106 forcing the magnetic tape 109 upward is small since the contact area is extremely small. In addition, as the tape is running while in constant contact with the member, wear of the restrictive member cannot be ignored in practice.

In order to overcome the problems, glass fiber or carbon fiber of 50–100 μm (limit) in length was added to the base resin in the prior art. However, the filler was too long, and the resultant surface was never smooth enough. Although the strength of guides may increase by the addition of the filler, there were other problems such as the loss of magnetic powder from the tape or uneven wear at the guide portions.

Japanese Patent Application Laid-Open No. Sho 59-207050 discloses a magnetic recording/reproducing device for video images in which the tape guides are made of polyacetal resin, polybutylene terephthalate resin or polyethylene terephthalate resin blended with fibers of potassium titanate at a weight ratio of 5-30%, the fiber having the diameter of 1 μm or less, length of 5-100 μm and the ratio of length L against diameter D, L/D=10-200. The tape guides have a good slidability which is comparable to one of tape guides made of hard chromium-plated stainless steel.

Unlike the head for video image recording, audio tape recorders may be mounted on an automobile wherein during the midsummer the temperature would rise as high as 80° C., and reliability at high temperatures becomes critical.

DISCLOSURE OF THE INVENTION

A primary object of the present invention is to provide a magnetic head with wider range of usable area without increasing the angle of the sloped sections of the tape guides.

A second object of the invention is to provide a magnetic head which has a high reliability at high temperatures and a high slidability.

In order to achieve these objects, the magnetic head according to the present invention which has on its each side a tape guide which comprises a slide contact section against which a magnetic tape slides, a restrictive section at one end of said slide contact section against which one edge of said tape slides, and a sloped section which forces said tape toward the restrictive section, is characterized in that at least one of the tape guides has a stopper portion formed on the sloped section at the slide contact section side to restrict the displacement of the tape toward the sloped section. In an embodiment of the present invention, the magnetic head is further characterized in that said stopper members are provided on both of the tape guides located on both sides of the head.

In the magnetic head according to the present invention which has on each side thereof a tape guide which comprises a slide contact section against which the magnetic tape slides, a restrictive section at one end of said slide contact section against which one edge of the tape slides, and a sloped section on the other end of said slide contact section which forces the tape toward the restrictive section, the tape guides are made of nylon resin blended with whiskers at a weight ratio of 10–40%, the whisker having the diameter of 0.2–0.5 μm and the length of 10–20 μm.

In an embodiment of the present invention, the magnetic head is further characterized in that at least one of the tape guides on both sides of the head has the stopper portion and that the tape guides are made of nylon resin blended with whiskers having the diameter of 0.2-0.5 μm and length of 10-20 μm at a weight ratio of 10-40%.

In another embodiment of the present invention, the magnetic head is characterized in that said whisker is a fiber of potassium titanate.

BRIEF DESCRIPTION OF THE DRAWINGS

FIGS. 11-13 show other embodiments of the present invention, wherein FIG. 11 is a side view of an audio magnetic head with no azimuth adjustment, FIG. 12 is a perspective view thereof, and FIG. 13 is a perspective view of an embodiment wherein additional tape guides are arranged at a distance from an audio magnetic head with no azimuth adjustment.

FIG. 14 is a side view to show the tape guide of a conventional magnetic head.

FIG. 15 is a front view to show the state of the tape when said magnetic head is inclined.

FIG. 16 shows the correlation between the inclination angle of the magnetic head and the output level.

PREFERRED EMBODIMENT OF THE INVENTION

Figure 1:
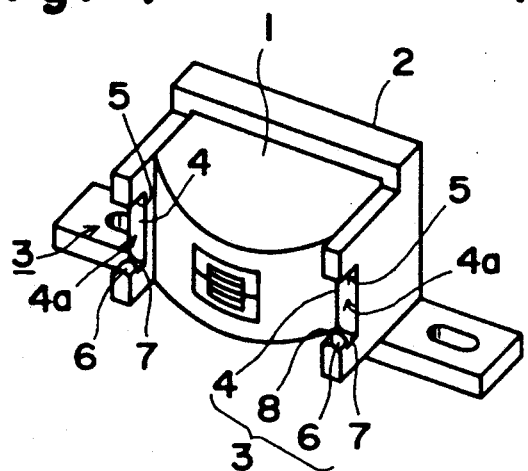
FIG. 1 is a perspective view to show an embodiment of a magnetic head according to the present invention.
Figure 2:
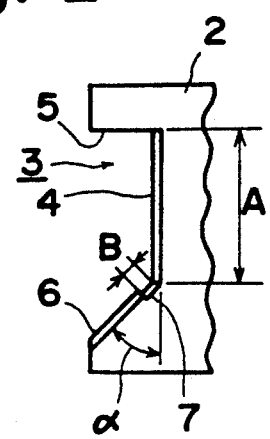
FIG. 2 is a side view to show the tape guide of the magnetic head.

The present invention will now be described in detail referring to the embodiments having the constructions shown in the accompanying drawings.

FIGS. 1-7 show one embodiment of a magnetic head according to the present invention. The magnetic head comprises a head holder 2 integrally structured with tape guides and an attachment base, and a head main body 1. A tape guide 3 each provided on the head holder on both sides of the main body 1 includes a slide contact section 4 which has a width A and against which a magnetic tape 9 slides, a restrictive section 5 which is located at one end of the slide contact section 4 to restrict the displacement of a magnetic tape 9 in the direction of width, and sloped section 6 which is located at the other end of the slide contact section 4 to force the magnetic tape 9 toward the restrictive member 5. At the boundary between the sloped section 6 and the slide contact section 4, a dent 7 is provided along the direction of the tape running to form a stopper 8 which prevents the tape 9 from moving toward the sloped section 6.

Figure 3:
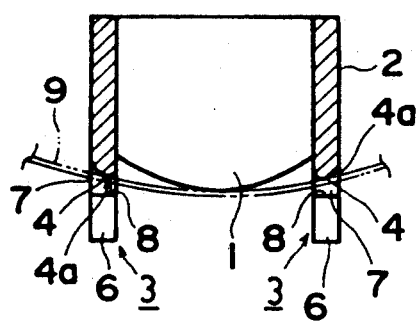
FIG. 3 is a plan view of the magnetic head showing the slide contact face of the tape guide in section.

The face 4a of the slide contact section 4 which comes in contact with the tape 9 is either sloped or curved in the direction of the tape running, as shown in FIG. 3. Faces 6a and 7a of the sloped section 6 and the dent 7 respectively are also sloped or curved. The sloped section 6 is inclined at an angle of a with respect to the slide face 4a.

The sloped face 7a of the dent 7 in this embodiment is substantially parallel to the sloped face 6a. The width B of the dent 7 is preferably such that the sum of the width B and the width A of the slide face 4a is substantially equal to or slightly greater than the maximum width of the magnetic tape 9 (maximum allowable width according to the standard). It is noted that for the tape guide according to the present invention, the width A of the slide contact section 4 must be equal to or slightly smaller than the minimum width of the tape (minimum allowable width according to the standard) by the root of this tape guide system.

Figure 4:
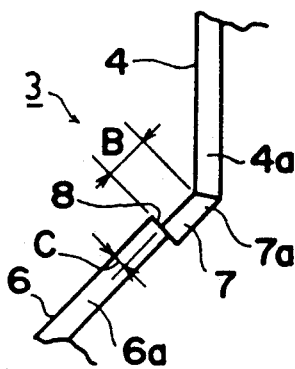
FIG. 4 is an enlarged side view of the tape guide to show the essential parts.

As for the stepwise depth C from the dent 7 to the sloped section 6 indicated in FIG. 4, it height is preferably slightly greater than the maximum thickness of the tape 9, or 20-40 μm. Each dent 7 provided on each tape guide 3 on the both sides of the main body 1 is so arranged that a line connecting the two dents 7,7 is at the right angle with respect to the gap G.

Figure 8:
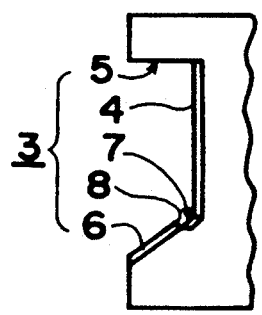
FIGS. 8-10 show variations of the tape guide in side view.
Figure 9:
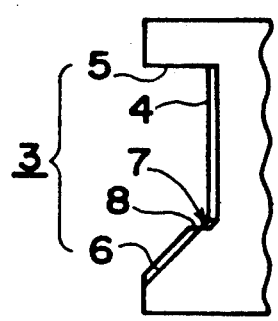
Figure 10:
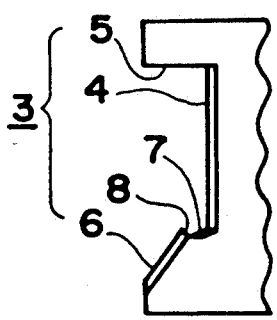

Variations of the dent 7 are shown in FIGS. 8-10. In FIG. 8, the dent 7 has a V-shaped stopper 8. The dent 7 in FIG. 9 has a stopper 8 which is parallel to the restrictive member 5. Then dent 7 shown in FIG. 10 is similar to the one shown in FIG. 8 except that the angle of inclination in the dent 7 is more gradual than the inclination of the sloped section 6.

The stopper 8 may be provided on either one of the tape guides 3. The material for the tape guide 3 is not specifically limited; for example, as will be discussed later, nylon resin blended with whiskers having the diameter of 0.2-0.5 μm and the length of 10-20 μm at a weight ratio of 10-40% may preferably be used.

Figure 5:
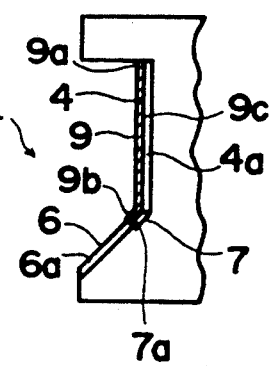
FIG. 5 is a side view of the tape guide in the state that a magnetic tape is sliding against it.
Figure 6:
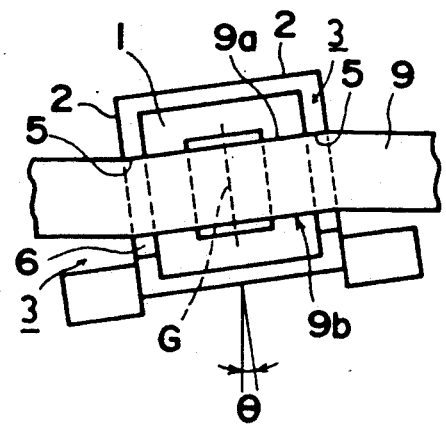
FIG. 6 is a front view of the magnetic head to show the state of the tape when the head has inclined.

When the magnetic tape 9 runs along the slide contact section 4 of the head having the above mentioned construction, one tape edge 9b will have been caught in the dent 7 by the time the other tape edge 9a abuts against the restrictive member 5, as shown in FIG. 5. Once the tape 9 is caught in the dent 7, the stopper 8 prevents the tape 9 from moving toward the sloped section 6 because the tape edge 9a is abutted against the stopper even if the magnetic head is attached deviating from the standard attachment angle (e.g. vertical direction) at an angle of θ as shown in FIG. 6. This secures stable running of the tape between the tape guides 3,3 on both sides of the head, and the azimuth with respect to the head gap G is made constant.

Figure 7:
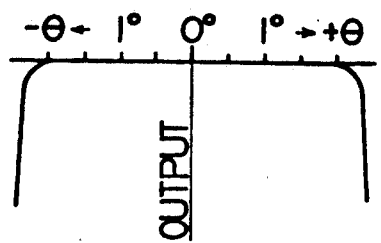
FIG. 7 shows the correlation between the inclination angle of the magnetic head and the output level.

Thus, in the case the inclination angle θ of the head is small, the azimuth is maintained as one tape edge 9a abuts against the restrictive member 5. In the case the inclination angle θ becomes large due to fluctuations in the products, a favorable azimuth is maintained as the other tape edge 9b is stopped by the stopper 8 even if the tape edge 9a is disengaged from the restrictive member 5. For example, as shown in FIG. 7, output does not drop until the head deviates from the predetermined angle of attachment by an inclination angle θ of about ±100'-150'. When compared with the conventional magnetic head shown in FIGS. 14-15, the range of inclination angle where there is no drop in output was confirmed to be twice as broad in the present invention. It goes without saying the dimensions of the heads other than at the dent 7 and the measurement conditions were identical in the measurement of outputs for comparison.

The magnetic head according to the present invention can be structured simply by providing the dent 7 and the stopper 8 on the sloped section 6 of the conventional head holder 2 and yet is advantageous in that allowable range of inclination angle θ is almost twice as broad as the conventional head without cost increase.

With the head being as above, the component parts in the recording/reproducing system including the base to which the magnetic head is to be attached need not be overly precise, and the azimuth can be stably maintained upon attachment of the head to the system. Therefore, it is possible to introduce robots in assembling the system similarly to the case of mounting circuit components.

Figure 11:
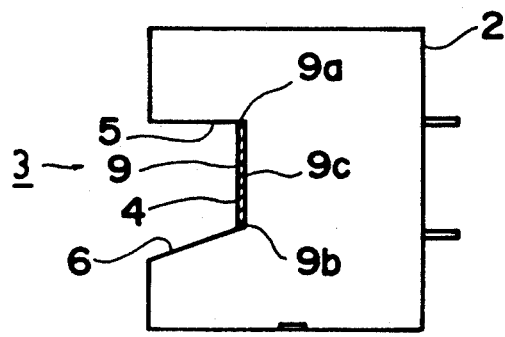
Figure 12:
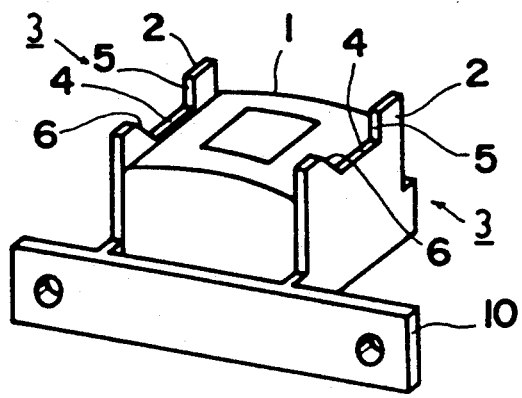

FIGS. 11-13 show other embodiments of the present invention. The audio magnetic head shown in FIGS. 11 and 12 is of the type which requires no azimuth adjustment. The head holder 2 includes tape guides 3,3 on both sides of the head body 1 that are formed integral with a fixing plate 10. Each tape guide 3 includes the slide contact section 4 against which the magnetic material coated surface 9c of the tape 9 slides, the restrictive member 5 located on one end of the slide contact section and against which one edge 9a of the tape 9 slides, and the sloped section 6 on the other end of the slide contact section 4 having a slope for forcing the tape 9 toward the restrictive member 5.

Among the components of the head holden 2, at least the tape guides 3,3 are made of nylon resin blended with whiskers having the diameter of 0.2-0.5 μm and the length of 10-20 μm at a weight ratio of 10-40%. Suitable whiskers include whisker of potassium titanate [$K_2O$-$nTiO_2(n=6)$]. Whiskers are effective in obtaining high strength, elasticity, slidability and heat resistance.

Still another embodiment is shown in FIG. 13. The audio magnetic head 1 of the type with a azimuth adjustment is, as mentioned above, provided with a tape holder 2 having tape guides 3,3 on both sides of the head. Further, this embodiment includes additional tape guides 11,11 made of the same material and substantially of the same shape as the tape guides 3,3 above. The tape guides 11,11 are arranged near the tape holder 2 along the path of the tape to secure stable feeding of the tape. Although not shown, it is preferable to a provide a stopper 8 such as shown in FIGS. 1-8 to at least one of the tape guides 3,3 of the above mentioned composition.

As has been described in the foregoing, the magnetic head according to the present invention is characterized in that the tape guide 3 is made of nylon resin as the base resin to improve the pressure characteristics at high temperatures. Because of the addition of very fine whiskers having the diameter of 0.2-0.5 μm and the length of 10-20 μm, the surface smoothness of the tape guide after molding improves greatly over those containing the conventional glass fiber or carbon fiber and thereby improves the slidability of the tape remarkably. Wear resistance of the restrictive section 5 and/or other sections under tape running is greatly improved, whereby reducing deformation of the restrictive member 5 against which the tape edge 9a slides even if an extremely large force per unit area is applied. Deformation can also be reduced during use at high temperatures. As a result, deviation of the tape from the track or the azimuth can be reduced, providing an audio magnetic head with excellent S/N ratio signal to noise ratio, output level, and frequency characteristics at high temperatures.

What we claim is:

1. A tape guide for and including a slide contact section against which a magnetic tape slides, a restrictive section defined at one end of said slide contact section, said restrictive section being so adapted that one edge of said magnetic tape slides there against, such as to restrict displacement of said tape in a direction toward said one end of said slide contact section, and a sloped section defined at another end of said slide contact section, said sloped section being so sloped relative to said slide contact section that said tape running on said slide contact section is forced along said sloped section toward said restrictive section, characterized in that said tape guide has a stopper portion comprising a recessed portion in said sloped section with a wall joining said recessed portion with said sloped section, said wall restricting displacement of said tape toward said sloped section, said stopper portion being adjacent to said slide contact section, in such a manner that a length of said slide contact section between said restrictive and sloped sections and a length between said another end of said slide contact section and said stopper portion are substantially equal to or slightly greater than a width of said magnetic tape.

2. The tape guide as claimed in claim 1 wherein said tape guide is disposed on each side of said magnetic head, and wherein said stopper is provided on both of said tape guides.

3. A tape guide for guiding a magnetic tape in its movement across a magnetic head, comprising a slide contact section against which said magnetic tape slides, a restrictive section at one end of said slide contact section against which one edge of said tape slides, and an inclined section that forces said tape toward said restrictive section, which is characterized in that said tape guides are made of nylon resin blended with fiber whiskers having a diameter of 0.2-0.5 μm and a length of 10-20 μm at a weight ratio of 10-40%.

4. The tape guide as claimed in claim 3 wherein said tape guide is made of nylon resin blended with fiber whiskers having a diameter of 0.2-0.5 μm and a length of 10-20 μm at a weight ration of 10-40%.

5. The tape guide as claimed in claim 3 wherein said fiber whisker is a fiber of potassium titanate.

* * * * *